Dec. 18, 1928.
B. OPITZ
1,695,501
AUTOMATIC VOLUMETRIC MEASURING DEVICE
Original Filed Oct. 20, 1925
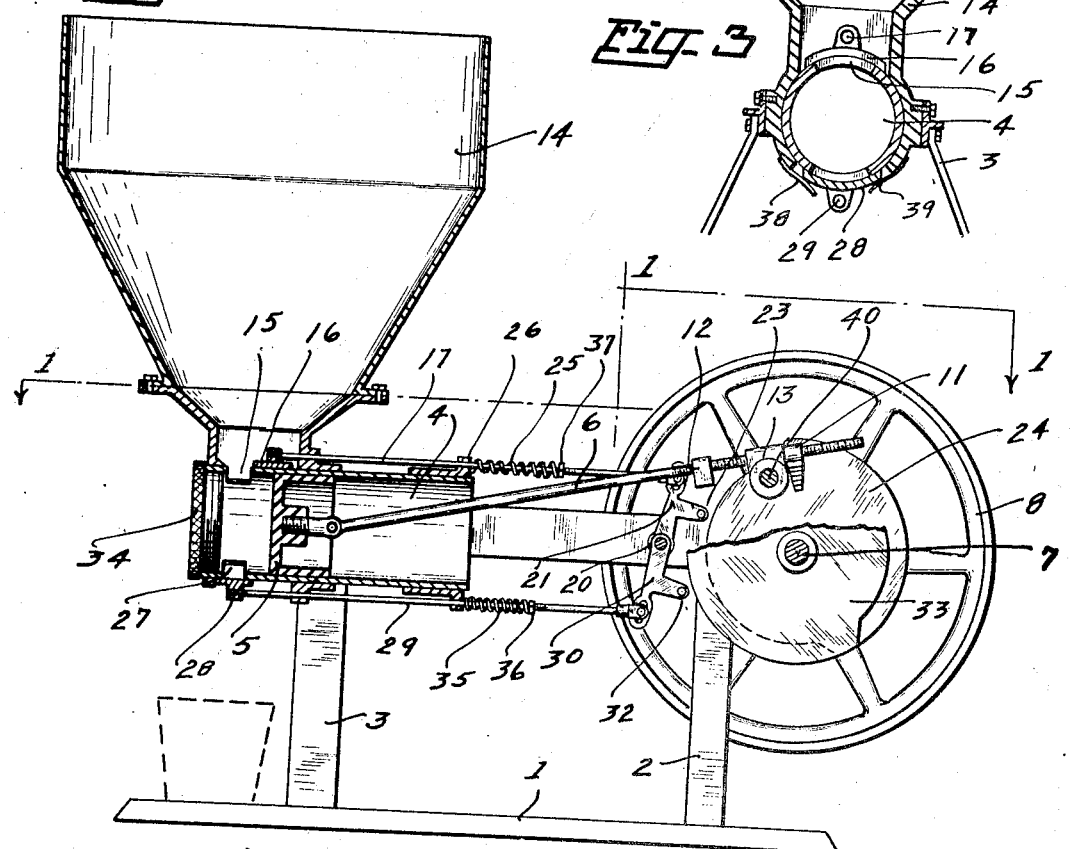
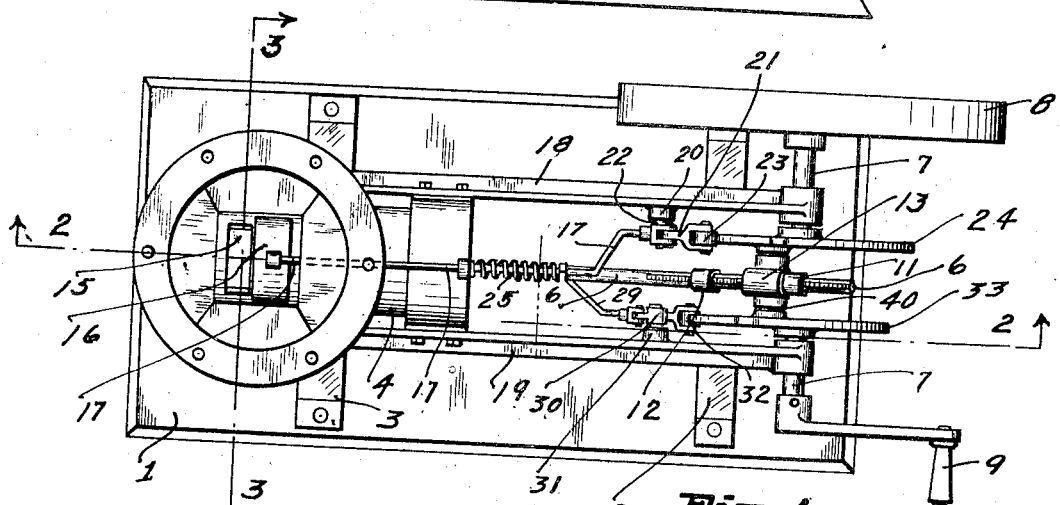
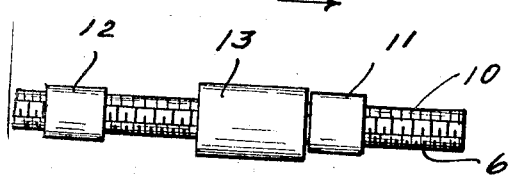
Inventor
Bernhard Opitz
Attorney
Thomas Bilyeu Patented Dec. 18, 1928.

1,695,501

UNITED STATES PATENT OFFICE.

BERNHARD OPITZ, OF PORTLAND, OREGON.

AUTOMATIC VOLUMETRIC-MEASURING DEVICE.

Application filed October 20, 1925, Serial No. 63,656. Renewed May 14, 1928.

My invention relates to measuring devices for the accurate measuring of substances while in a condition of fluidity.

The same may also be used for measuring those mediums having a fluidal tendency, or which may assume a condition of flow when acted upon by the device.

My invention is particularly well adapted to the measuring and placing of ice cream in containers while the ice cream is in a state of semi-fluidity. The ice cream being placed in a hopper container is passed through the measuring cylinder and deposited in containers for that purpose disposed below the measuring cylinder and at the point of the location of the discharge ports.

A further object of the invention, consists in providing automatic means for inducing a measured amount of the material to be automatically measured into a cylinder, the closing of the port leading thereinto and the opening of a port leading therefrom simultaneously and the depositing of the measured amount of material, then within the cylinder, through the discharge ports leading from the cylinder.

A further object of my invention, consists in automatic means for controlling the closures for the ports leading into and away from the cylinder and for also determining accurately the volumetric content of the cylinder in advance of the same being operated.

My device may be selectively operated, either by manual manipulation, or by power manipulation.

A further object of my invention, consists in providing a hopper receptacle for the maintaining of materials to be measured the same being located above the measuring device. A discharge outlet leads from the hopper into the measuring cylinder. The measured amount of material is then deposited through the discharge ports into a convenient container disposed at the outlet port.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a top, plan view, of the assembled machine taken on line 1—1 of Fig. 2, looking in the direction of the arrows.

Fig. 2 is a sectional view, taken on line 2—2 of Fig. 1, looking in the direction indicated.

Fig. 3 is a cross section view, taken on line 3—3 of Fig. 1, looking in the direction indicated.

Fig. 4 is a fragmentary, top, plan view, of the mechanism for regulating the length of stroke of the piston within the cylinder.

Like reference characters refer to like parts throughout the several views.

1 is the base upon which the mechanism is assembled, the same being supported upon the base through standards 2 and 3, and the same consists primarily of a cylinder 4, having a reciprocating piston 5, disposed therein. The reciprocating piston is actuated through the medium of a piston rod 6, secured to the crank 7. The crank 7, is adapted to being actuated through the medium of a fly-wheel pulley 8, or through a hand crank 9, depending upon the volume and consistency of the materials to be measured. To regulate the length of stroke of the piston within the cylinder, I have threaded the piston rod, as shown at 10, and have in threaded relationship therewith, nuts 11 and 12, disposed upon either side of the connection with the crank, as shown at 13. A hopper 14, is disposed above the measuring cylinder, having discharge port 15, disposed at the bottom thereof, leading into the cylinder, and a cut-off valve 16, is disposed above the port which is actuated through the medium of the valve stem 17. Crank 7, is journaled in the side-frame members 18 and 19. Secured to the side frame member 18, is a bracket 20, into which the rocker arm 21 is journaled about the pin 22. The rocker arm 21, carries a roller bearing 23, which engages with the cam 24. The valve stem 17, is secured to the rocker arm 21, and in pivotal relationship, the object of which is to regulate and open and close the valve 16, for closing the inlet port from the hopper to the measuring cylinder. The spring 25, about the valve stem 17, is a compression spring, and is adapted to maintaining the roller 23, in contact with the surface of the cam 24. The outlet port 27, leading from the measuring cylinder is opened and closed through the action of valve 28, which is secured to the valve stem 29. The valve stem 29, is maintained in pivotal relationship with the rocker arm 30, which is secured to the bracket 31, and is maintained in fixed position within the side frame member 19. This rocker arm 30, also carries a roller bearing 32, which engages the surface of the cam 33. The cams 24 and 33, are secured to the crank 7, and as the crank is rotated the valves also are actuated and are so timed in their relationship with each other that as the inlet port 15, is opened by the releasing of the valve 16, the outlet port 27 is closed through the movement of the valve 28, and materials to be measured are permitted to enter into the measuring cylinder. The measuring cylinder has a cylinder head 34, in threaded relationship with the cylinder and is made removable by being unscrewed therefrom, to permit of the easy cleaning of the cylinder 4, and also for regulating the volume of the cylinder. The flow of material from the hopper into the measuring cylinder is induced, if of a semi-liquid material, or if of a plastic nature, by the rearward movement of the piston within the cylinder. This may be increased if a close fitting is maintained between the cylinder and the piston. The compression spring 35, disposed about the valve stem 29, maintains the roller bearing 32, in intimate contact with the cam 33. Adjustments may be made upon the compression springs by gland nuts 36 and 37. The port valves are maintained in close working relationship with the cylinder and across the port, through the action of valve retaining springs 38 and 39, as best illustrated in Fig. 3. The adjusting nut 11, is preferably made heavy on the underside to prevent the unscrewing of the same about the piston rod 6. The connection 13, between the piston rod 6, and the crank 7, is made to rotate about the wrist pin 40, and the length of the piston rod 6, disposed on the forward end of this connection with the wrist pin, determines the volume to be created within the cylinder at each stroke of the piston; while the length of stroke remains a constant, yet the distance that the piston moves toward the piston head of the cylinder, determines the volume of the cylinder and therefore the volume of the material to be permitted to enter the cylinder at each stroke of the piston.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. In an automatic volumetric measuring device, a cylinder, a cylinder head threadable to one end of the cylinder, a piston reciprocable within said cylinder, a revolubly mounted crank, a piston rod secured to said piston at its one end and to said crank at its opposite end, an inlet and an outlet port for said cylinder, valves to open and close said ports, a valve stem, a rocker arm and a revolving cam to close each of said valves, compression springs to open said valves, said cams being mounted on said crank shaft and having their cam surfaces oppositely disposed to close said valves oppositely, and means upon said piston rod to vary the stroke of said piston.

2. In an automatic volumetric measuring device, comprising a base, support standards mounted on said base, side frame members mounted on said support standards, and parallel with said base, a cylinder mounted on said side frame members, a crank shaft revolubly mounted on said side frame members, a cylinder head threadable into said cylinder, a piston reciprocable within said cylinder, a connecting rod disposed between the piston and the crank shaft, there being oppositely disposed inlet and outlet ports formed in said cylinder, cams mounted on said crank shaft and rotatable therewith, rocker arms mounted on said side frame members and engaging said cams, valves to close and open said ports in said cylinder, valve stems disposed between said valves and said rocker arms, compression springs about said valve stems to normally maintain said valves in an open position, valve retaining springs disposed adjacent the outlet valve to maintain said valve in engagement with said cylinder, and means to vary the stroke of the piston within said cylinder.

3. An automatic volumetric measuring device embodying a base, support standards mounted on said base; side frame members mounted on said support standards and disposed parallel said base; a cylinder mounted upon said side frame members; a crank shaft revolubly mounted on said side frame; a cylinder head removably secured to said cylinder; a piston reciprocable within said cylinder; a connecting rod connecting the crank of said crank shaft to said piston; an upper inlet port formed through the wall of said cylinder; and a lower outlet port formed through the wall of said cylinder; a hopper mounted upon said cylinder, said hopper being provided with an outlet embracing said inlet port; cams mounted on said crank shaft and rotatable therewith; rocker arms engaging said cams, mounted upon said side frame members; sliding valves for each of the aforementioned ports; a valve stem connecting each valve to a rocker arm; a compression spring mounted about each valve stem to withdraw each valve from its associate port; valve retaining springs disposed adjacent the outlet valve to maintain said valve in engagement with said cylinder; and means to regulate the length of the stroke of the piston.

BERNHARD OPITZ.